UNITED STATES PATENT OFFICE.

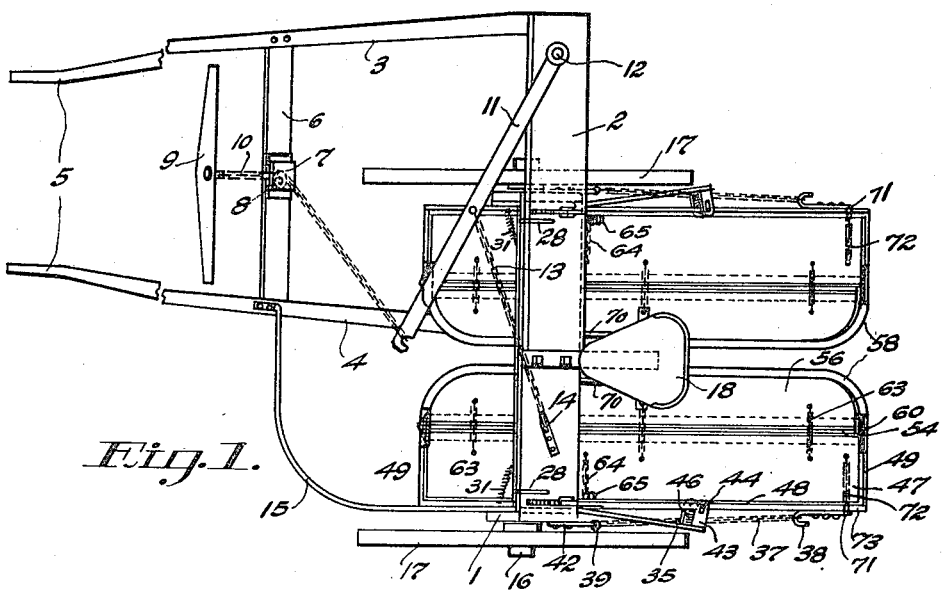

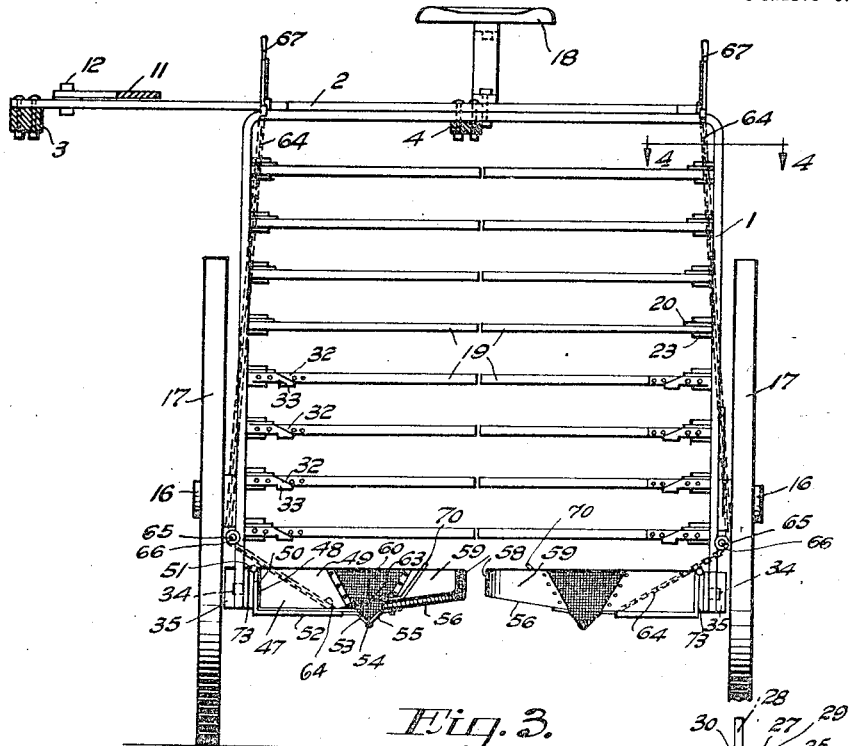

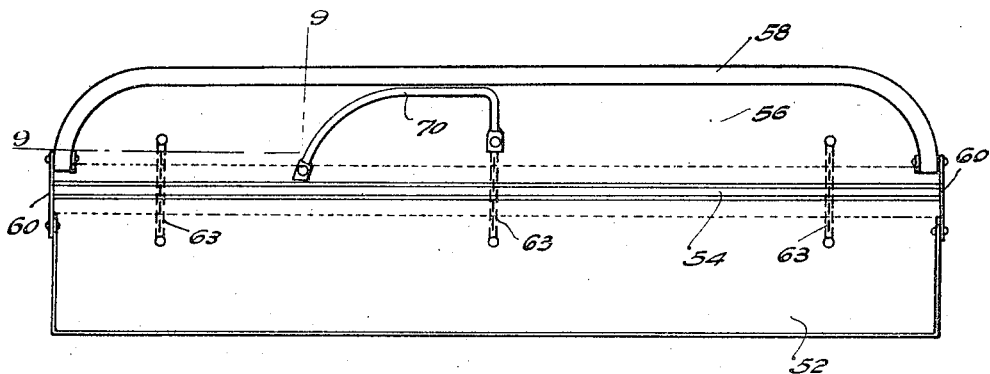
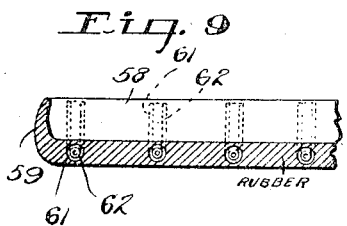
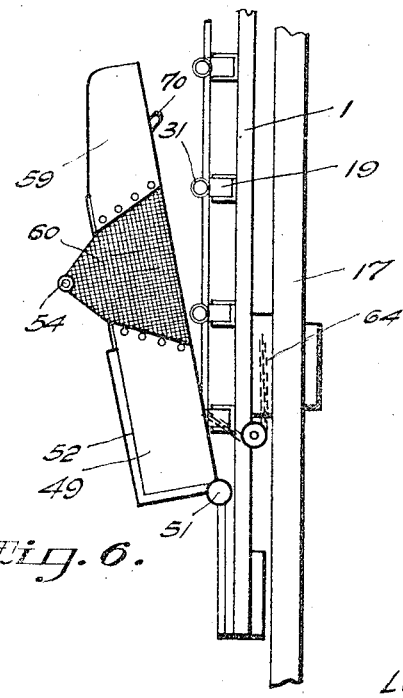

LUTHER PATTON, OF WEST BLOCTON, ALABAMA.

INSECT-CATCHER.

1,289,250.

Specification of Letters Patent. Patented Dec. 31, 1918.

Application filed April 18, 1918. Serial No. 229,385.

*To all whom it may concern:*

Be it known that I, LUTHER PATTON, a citizen of the United States of America, residing at West Blocton, in the county of Bibb and State of Alabama, have invented certain new and useful Improvements in Insect-Catchers, of which the following is a specification.

This invention relates to insect destroyers of the type adapted for dislodging and catching boll weevils and like plant injuring insects.

The object of my invention is to design an apparatus which is light, comparatively inexpensive in construction and which is adapted to be drawn by a horse.

A further object of my invention relates to certain improvements in the plant shaking and insect dislodging devices and in this respect my present invention constitutes an improvement on the Letters Patent No. 1,256,036, issued to me jointly with H. B. Wallace, and No. 1,241,012, issued to Samuel J. Patton. The novel features of this phase of my invention relate to the spring rigging for holding the beater arms yieldingly in operating position and which is adapted to fold in against the frame when the beater arms are moved into inoperative position alongside of and parallel with the frame. The beater mechanism is designed not to interfere with the vertical adjustment of the insect catching pans.

A further object of my invention is to improve the construction of the folding pans and more particularly of their adjacent plant engaging portions which are preferably formed of a yielding material which will preserve its shape and yet give in all directions when engaged by the plants to avoid injuring them.

A further object of my invention is to yieldingly mount the insect catching pans on the frame so as to permit the rear ends of the pans to be freely adjusted to different heights while maintaining their proper spacing throughout these adjustments by yieldable frame supported devices which normally hold the pans in predetermined relative positions but permit them to swing apart.

My invention also comprises the various other details of construction and arrangements of parts which are hereinafter pointed out in the claims and more particularly described in the specification by reference to the accompanying drawings which illustrate only the preferred embodiment of my invention, and in which:—

Figure 1 is a plan view of my apparatus.

Fig. 2 is a side elevation of Fig. 1.

Fig. 3 is a front elevation of one of the pans shown in transverse cross section.

Fig. 4 is an enlarged detail plan view taken on the line 4—4 of Fig. 3.

Fig. 5 is a detail perspective view showing one of the bracket bearings and a shaker bar adapted for mounting therein.

Fig. 6 is an enlarged front elevation of one side of the frame showing the pan folded up.

Fig. 7 is a partial plan view of the yieldable section of the trough.

Fig. 8 is an enlarged detail sectional view through the outer portion and hinge joint of the pan.

Fig. 9 is a partial vertical sectional view of the rubber portion of the tray taken on the line 9—9 of Fig. 7.

Similar reference numerals refer to similar parts throughout the drawings.

My apparatus comprises an inverted U-shaped structural metal frame 1 having attached by bolts or rivets along its flat top surface a bar 2 which overhangs substantially to the right side of the frame, see Fig. 1. Bars 3 and 4 are rigidly attached to this bar 2, one at its right end and the other over the center of the frame. The front ends of the bars 3 and 4 form shafts 5 and at an intermediate point they are braced together by a cross bar 6. A whiffle tree 9 is connected to a suitable equalizing draft rigging connected to the bar 2, the details of which are not described as the same forms no part of my present invention. The shaft bar 4 is braced to the far side of the frame 1 by means of an outwardly and downwardly curved bar 15 having its upper end attached to the bar 4 near the cross bar 6 from which point it extends at right angles to a point practically in line with the left hand side of the frame and is then bent downwardly and its lower end riveted to the side of the frame 2 opposite the stub axle 16 upon which the left hand wheel 17 is journaled. A similar wheel 17 is journaled on the other side of the frame and a driver's seat 18 is secured by bolts passing through the center of the top member of the frame 1 and the bar 2.

The mechanism for dislodging the insects from the plants comprises a series of beaters 19 preferably formed by wooden bars having at their outer ends a bearing plate 20 with a hole 21 therein alining with a pivot hole through the bar. The forward edge of each plate 20 is provided with a stop shoulder 22 to arrest the forward movement of the bar when it reaches a point at right angles to the frame. Each bar is pivotally mounted to swing horizontally on a bearing bracket such as 23 which is riveted to the inside walls of the frame sides. The upper and lower bearing brackets are provided with a lateral extension 24 having an overturned bearing lug 25 perforated at 26 to receive the upper end of a spring bar 27. This bar 27 has a straight vertical body portion with its upper and lower ends bent at right angles thereto and upturned so as to be received in the bearing lugs 25 and supported thereby to swing horizontally about a vertical axis. The upper end of this spring bar extends up through the top of the frame and is provided with a handle 28 by means of which it can be turned by the driver. A spring latch 29 is mounted on the frame 1 preferably by bolts holding one of the intermediate bearing brackets 23 and the forward end of this latch is bent at right angles and provided with a detent 30 adapted to engage and hold the spring bar 27. To each of the shaker bars 19 is attached a coil spring 31, which at its other end is made fast to the spring bar 27 which thus controls all of the springs which normally hold the several shaker bars on their respective side of the apparatus in operative position. When the spring bar is released from the detent 30, it is free to swing to dotted position, Fig. 4, in doing which it releases the tension on the springs 31 and permits the bars 19 to swing back against and parallel with the frame 1. The stops 22 prevent the springs drawing the shaker bars forwardly beyond a position at right angles to the line of movement. By grasping the handle 28 the spring bar can be jerked from the detent 30 or can be forced back into engagement therewith.

All of the three lower shaker bars on each side of the frame are provided with a hinge 32 which permits them to swing upwardly, the outer end carrying a stop member 33 which prevents the bars dropping below a horizontal position. The necessity for this arrangement arises from the use of pans which will be later described and which are intended to be swung upwardly so as to clear obstructions. If the bars were not free to yield, as shown in Fig. 6, these pans could not be swung upwardly.

The apparatus comprises pans for catching the insects as they are dislodged by the shaker bars from the plants. The pans are mounted on bars 73 at the lower ends of the frame sides being loosely connected thereto by pivot pins 34 disposed near the forward end of the bar and passing through the forward ends of short bars 35 which are connected rigidly to the frame sides by rivets 36 and which have their rear ends bent outwardly away from the center line of the apparatus. The rear end of each pan is supported by a chain 37 connected to a hook 38 on bar 73 at one end and at the other end connected to a hook 39 adjustable by means of a nut 40 on a bolt 41 having a flattened end 42 made fast near the top of the frame side. The rear end of each outwardly bent plate 35 has rigidly attached thereto a U-shaped bracket 43 disposed substantially vertically and having its top and bottom members longitudinally slotted to receive the pins 44 provided at the ends of a bearing bar 45 which is pressed outwardly by coil springs 46 interposed between it and the back of the yoke frame. These springs normally press the bar outwardly until its pins engage the outer end walls of the slots. The outside edge of the trays near an intermediate point will bear against their respective bars 45 which will yieldingly resist the separating movements of the pans. The pivotal attachment of the pans to the frame is loose enough to provide the horizontal and vertical play necessary to permit the pans to be adjusted vertically and to yield freely laterally.

The pans are especially designed to protect the plants from injury and each comprises an outer metallic body portion 47 which has an upturned side flange 48 and end flanges 49. The flange 48 is riveted to one member 50 of a leaf hinge, the other member 51 of which is riveted to the adjacent bar 73 and carries a hinge pin disposed substantially at the top of the pan flange 48. The hinge member 50 is elongated and its end 52 is bent under and secured to the bottom of the pan portion 47. The end walls 49 of this outside pan portion are cut away substantially on a 90° angle so as to slope down to the inner side edge of the pan to the under side of which is bolted an angled hinge strip 53, the free end of which is inclined downwardly and provided with eyes to receive a longitudinal hinge pin 54 by means of which a hinge strip 55, similar to 53, is pivotally connected to the latter strip. The inside pan portion 56 is bolted in position between the strip 55 and a bar 57, and is formed of flexible material preferably of rubber molded to have an upturned plant engaging side flange 58 along its inner edge and joining end flanges 59 which slope downwardy to the outer side edge of the pan portion. A bellows strip 60 of any suitable material is connected to the adjacent end edges of the flanges 49, 59 and hinge strips 53 and 55, thus closing the ends of the pan while leaving the inner pan portion 56 free to swing upwardly on the hinge 54. The rubber pan portion 56 is molded with a series of pockets 61 therein extending from its outer side edge through the bottom and upwardly to the point near the top of its flange 58 and into these pockets are inserted coil springs 62 which are especially shaped to conform to the shape of the pockets and thus aid in preserving the shape of the pan portion while leaving it free to yield in all directions.

The pan portion 56 is prevented from dropping below a horizontal position by means of chains 63 connected at one end to the outside pan portion 47 and at the other end to the portion 56. The arrangement of the hinge 54 below the bottom level of the pan increases the effectiveness of these chain supports. Preferably they can connect the upper adjacent edges of the flanges 49 and 59 extending, if desired, through and reinforcing the top of the flexible filler strip 60.

In order to swing the pans upwardly out of operating position, as shown in Fig. 6, I provide operating chains 64 each connected to a pan portion 47 and passing upwardly at an angle about a pulley 65 journaled on a bracket 66 overhung rearwardly from the frame side. The chains pass from the pulleys upwardly to levers 67 mounted on the top of the frame and are provided each with a grip latch 68 engaging a quadrant rack 69. By means of these levers the pans can be quickly raised by the driver so as to avoid injury from stumps, rocks and the like.

As the lower shaker bars might be inclined rearwardly when the pans are swung or yield upwardly and in such position the bar might catch on the flange 59 and arrest the upward movement of the pan, I have arranged a guard 70 which is bolted to the upper bar 57 and is so shaped as to catch the lower shaker bars at their various angular positions rearwardly and to ride them over the flange 58 as the latter moves upwardly. The elevation of the pans can be easily controlled by the adjustment of the chains 64. To support the rear outer edge of the pan portion 56 I provide an upright 71 at the rear end of the bar 73 and from the end of this upright a chain 72 leads downwardly to and serves to support the weight of the pan while at the same time leaving it free to yield and swing upwardly.

In operation, the apparatus is driven through the field with the pans working on each side of the plants of a row and as it passes over the plants the shaker bars yieldingly engage and shake the plant limbs dislodging the insects which fall therefrom into the pans from which they are collected in any suitable manner and destroyed by being burned or otherwise disposed of. The pans are free to yield laterally against their supports 45 and to yield upwardly on their hinge connections 54 and 51, and in addition thereto the plant engaging portion of the pan is itself flexible. I thus obtain the maximum flexibility and adjustability for the pans so that they can work very closely together under the plant limbs without injury to the plants.

This invention is not intended to be restricted in scope to the specific embodiment shown, but contemplates such modifications as come within the spirit and scope of the claims.

Having thus described my invention, what I claim as new and desire to secure by Letters Patent, is:—

1. In an insect catching apparatus, an arched frame having wheel supports on its sides, plant shaking means, rearwardly and outwardly inclined bottom members connected to the frame sides, an inturned yieldable element supported by said members, pans loosely connected to the bottom of the frame, and flexible means to support the rear ends of the pans in engagement with said yieldable elements which are adapted to permit the pans to give laterally, substantially as described.

2. In an insect catching apparatus, an arched frame having wheel supports on its sides, plant shaking means, rearwardly and outwardly inclined bottom members rigidly connected to said frame sides, an inturned yieldable element supported by the rear ends of said members, pans loosely connected to the bottom of the frame, flexible means to support the rear ends of the pans in engagement with said yieldable elements which are adapted to permit the pans to give laterally, and means to adjust vertically the rear ends of the pans.

3. In an insect catching apparatus, an arched frame, wheel supports therefor, plant shaking means, pans pivotally mounted on the frame free to have a vertically and a limited lateral play, rearward extensions on the frame, spring means carried thereby to yieldingly resist the outward lateral movements of the rear ends of the pans, and adjustable flexible supports for the rear ends of the pans.

4. In an insect catching apparatus, the combination with an arched frame having wheel supports and plant shaking means, of pans loosely mounted near their forward ends on the frame so as to be capable of vertical and lateral play, a flexible connection from the frame to the rear end of each pan, hinge means to permit the pans to fold bodily upwardly, and mechanism to raise and lower the pans on their hinges, substantially as described.

5. In an insect catcher, an arched frame, an outwardly flaring rearwardly extending bar riveted to each side of the frame, a bar loosely pivoted to each outwardly flaring bar and disposed on its inner side, a pan hinged to each of said latter bars, means mounted on the frame to raise and lower the pan, and yielding means interposed between and adapted to space the rear ends of the connected pairs of bars, substantially as described.

6. In an insect catching apparatus, an arched frame, plant shaking devices carried thereby, insect catching pans hung from the bottom of the arch frame, each pan being divided longitudinally into inside and outside portions, hinged strips connecting said portions with their pivotal point substantially below the bottom of the pan, and flexible means connecting the pan portions across the hinge joint, substantially as described.

7. In an insect catching apparatus, a frame, insect dislodging means carried thereby, and pans to catch the insects, each pan being divided longitudinally into inside and outside portions hinged together, the inside pan portion being formed of yielding material.

8. In an insect catching apparatus, a frame, insect dislodging means, pans to catch the dislodged insects, each pan comprising an outside longitudinal metallic portion and an inside londitudinal flexible portion, a hinge connection for said portions, and supporting means for the pan portions which leave the flexible portion to yield and swing on its hinges.

9. In an insect catching apparatus, a frame, insect dislodging means carried thereby, pans to catch the dislodged insects, each pan comprising a longitudinal outside metallic member, a longitudinal inside flexible member forming part of the pan bottom and having a marginal flange forming the plant engaging edge of the pan, and means to support said yielding member free to yield, substantially as described.

10. In an insect catching apparatus, a pan having the longitudinal portion thereof comprising a substantial part of its bottom and its plant engaging edge formed of molded rubber, and reinforcing coil springs embedded in said rubber.

11. In an insect catching apparatus, a pan having a longitudinal portion thereof comprising a substantial portion of its bottom and its plant engaging edge formed of molded rubber, and reinforcing coil springs embedded in said rubber, said springs being shaped to extend crosswise through the bottom and up into the plant engaging edge.

12. In an insect destroying apparatus, a pan having a longitudinal portion thereof comprising a substantial portion of its bottom and its plant engaging edge formed of molded rubber having transverse pockets therein extending from its outer edge across its bottom portion and upwardly into the plant engaging edge, and coil springs seated in said pockets having a bend therein to conform to the cross section of the pans.

13. In an insect catching apparatus, means to dislodge the insects, means to catch the dislodged insects comprising a pan divided longitudinally into inner and outer portions, means to hinge the portions together, marginal flanges about the portions which at their ends slope downwardly to the hinge joint, and a flexible strip connecting said sloping flange edges and closing the space between them, substantially as described.

14. In an insect catching apparatus, a frame, plant shaking bars hinged thereto, a coil spring connected to each bar, and a swinging spring frame to which said springs are connected and which is movable to permit the shaker bars to fold rearwardly against the frame.

15. In an insect catching apparatus, a frame, plant shaking bars hinged thereto, a coil spring connected to each bar, a swinging spring frame to which said springs are connected and which is movable to permit the shaker bars to fold rearwardly against the frame, and latch means to hold the swinging frame in its forward operating position.

16. In an insect catching apparatus, a frame, plant shaking bars hinged thereto, a coil spring connected to each bar, a swinging spring frame to which said springs are connected and which is movable to permit the shaker bars to fold rearwardly against the frame, and latch means to hold the swinging frame in operating position, said frame carrying crank means by which it may be jerked into and out of engagement with said latch means.

17. In an insect catching apparatus, an arched frame, a series of shaker bars hinged to each side thereof, stop means to limit the forward swing of said bars, springs connected to said bars, a crank shaped swinging member pivotally mounted on each side of said frame and connected to the springs of adjacent bars, and latch means to hold said members in their forward operating position, said members when released being adapted to engage and swing rearwardly with said bars, as and for the purposes described.

18. In an insect catching machine, a frame, horizontally swinging shaker bars mounted thereon, pans hinged to the frame below the bars and adapted to swing upwardly, means to permit the lower bars to yield upwardly when engaged by the pan, guards on the pans to prevent the bars engaging the free upturned edges of the pans and blocking the upward swing of the latter, and means to swing the pans upwardly, substantially as described.

19. In an insect catching apparatus, a frame formed of a single arched member having insect dislodging means, pans loosely pivoted near the lower ends of said frame, flexible connections from the upper portion of the frame to adjust the elevation of the rear ends of the pans, and yieldable means to resist the separation of the rear ends of the pans, substantially as described.

20. In an insect catching apparatus, a frame formed of a single arched member having insect dislodging means, pans loosely supported near the lower ends of said frame, flexible connections from the upper portion of the frame to adjust the elevation of the rear ends of the pans, and yieldable means to resist the separation of the rear ends of the pans, said yieldable means being vertically elongated to maintain contact with the rear ends of the pans throughout their normal vertical adjustments.

21. In an insect catching apparatus, a frame formed of a single arch member having external wheel supports, internal plant shaking means, pans loosely mounted at the bottom of the frame, flexible supports inclined rearwardly from the frame to adjustably support the rear ends of the pans, yieldable means to resist outward lateral movements of the rear ends of the pans, said means for each pan comprising a support rigid with the frame, a vertically elongated bearing member adapted to engage the pans throughout their vertical adjustments and mounted free for lateral movements in said support, and spring means to resist such lateral movements outwardly of the bearing member, substantially as described.

In testimony whereof I affix my signature.

LUTHER PATTON.

Witness:
W. H. LOGAN.

Copies of this patent may be obtained for five cents each, by addressing the "Commissioner of Patents, Washington, D. C."